United States Patent [19]

Abrahamer

[11] 3,813,899

[45] June 4, 1974

[54] SLIDING COUPLING FOR PROPELLER SHAFTS

[76] Inventor: Salek Abrahamer, 42 Shomzion Hamalke, Tel Aviv, Israel

[22] Filed: May 23, 1972

[21] Appl. No.: 256,005

[30] Foreign Application Priority Data
May 28, 1971  Israel.................................. 36945

[52] U.S. Cl.............................. 64/23, 64/4, 64/32
[51] Int. Cl.............................................. F16d 3/06
[58] Field of Search........... 64/23 R, 23.5, 23.6, 32, 64/4

[56] References Cited
UNITED STATES PATENTS

| | | | |
|---|---|---|---|
| 2,116,290 | 5/1938 | Spicer | 64/23 |
| 3,123,990 | 3/1964 | Freeman | 64/23 |
| 1,973,702 | 9/1934 | Cooke | 64/23 |
| 3,242,695 | 3/1966 | Ross | 64/23 |
| 3,577,746 | 5/1971 | Dolan | 64/23 |
| 3,234,758 | 2/1966 | Lewis | 64/23 |

FOREIGN PATENTS OR APPLICATIONS

| | | | |
|---|---|---|---|
| 796,806 | 6/1958 | Great Britain | 64/23 |
| 798,737 | 7/1958 | Great Britain | 64/23 |

*Primary Examiner*—Samuel Scott
*Assistant Examiner*—Randall Heald
*Attorney, Agent, or Firm*—Benjamin J. Barish

[57] ABSTRACT

A sliding coupling for automobile propeller shafts comprises an inner shaft having external splines, an outer shaft having internal splines, and a telescoping sleeve joined to the inner shaft and bearing against the external surface of the outer shaft to maintain the two shafts in alignment, to support the coupling against sagging upon wear and to provide an enclosure for lubricating oil. In one embodiment, the inner shaft is formed with an axial passageway for lubricating oil supplied to the splines and to the inner surface of the telescoping sleeve, there also being a vaned-disc for circulating the oil. In another embodiment, an annular space is provided between the inner shaft and the telescoping sleeve at one end of the splines, and a second space is provided at the other end of the splines between the inner and outer shafts, these spaces serving as a reservoir for the lubricating oil which is supplied by centrifugal action to the splines and telescoping sleeve.

5 Claims, 4 Drawing Figures

SLIDING COUPLING FOR PROPELLER SHAFTS

BACKGROUND OF THE INVENTION

The present invention rleates to sliding couplings, and particularly to sliding couplings for automobile propeller shafts used to couple the universal joint to the rear axle.

In the conventional automobile propeller shaft sliding coupling, the propeller shaft is splined within an outer, larger diameter shaft fixed to the universal joint. To prevent vibrations and to reduce wear, it is important that the propeller shaft be exactly aligned and balanced with the universal joint. The wear in such a coupling occurs mostly on the upper faces of the inner (propeller) shaft splines rubbing against the lower faces of the outer shaft splines. Once wear starts on these faces, the coupling begins to sag, and the propeller shaft becomes misaligned and unbalanced with the universal joint. This produces vibrations in the coupling and also rapidly increases the rate of wear. In addition, such couplings are usually lubricated with grease, and if any of the sliding surfaces becomes dry of grease, the above-described problems are even further aggravated. Once the wear reaches 0.3–0.4 mm the coupling must be repaired or replaced.

BRIEF SUMMARY OF THE INVENTION

The present invention provides sliding couplings for propeller shafts which more securely maintain the alignment between the propeller shaft and the universal joint, and better lubricate these parts thus substantially lengthening the useful life of the coupling.

The present invention is particularly directed to sliding couplings for automobile propellor shafts comprising an inner shaft having an end formed with external splines, and an outer shaft of larger diameter than the inner shaft and having an axial bore formed with internal splines receiving the inner shaft.

According to the present invention, the sliding coupling is provided with a bearing sleeve having an inner diameter equal to the outer diameter of the outer shaft and telescopingly received thereover. One end of the bearing sleeve is rigidly joined to the inner shaft and the opposite end, for a substantial part of the sleeve length, bears against the external surface of the outer shaft to maintain the two shafts in alignment and to support the coupling against sagging upon the occurrence of wear. The coupling further includes an oil retainer seal between the external surface of the outer shaft and the said opposite end of the bearing sleeve, enabling the latter sleeve also to serve as a closure for lubricating oil for the coupling.

This construction substantially increases the life of the coupling in better lubricating the shafts and more positively maintaining them in alignment. In so doing, it reduces the possibility of vibrations and also the rate of wear in the coupling; and even when wear starts, the telescoping sleeve still maintains the shaft in alignment thereby further extending the useful life of the coupling.

According to one embodiment of the invention, the inner shaft is formed with a radial passageway connected to an axial passageway for lubricating oil, the outer shaft including an oil cap fixed within and enclosing the bore at the end thereof opposite to that receiving the inner shaft, the outer shaft further including a radial passageway for the lubricating oil.

According to another embodiment of the invention, the splined end of the outer shaft is axially spaced from the end of the bearing sleeve joined to the inner shaft, defining an annular space between the two shafts, the bearing sleeve being formed with an oil inlet port communicating with said space and supplying oil to the splines.

The invention is herein described, by way of example only, with reference to the accompanying drawings, wherein.

Figure 1:
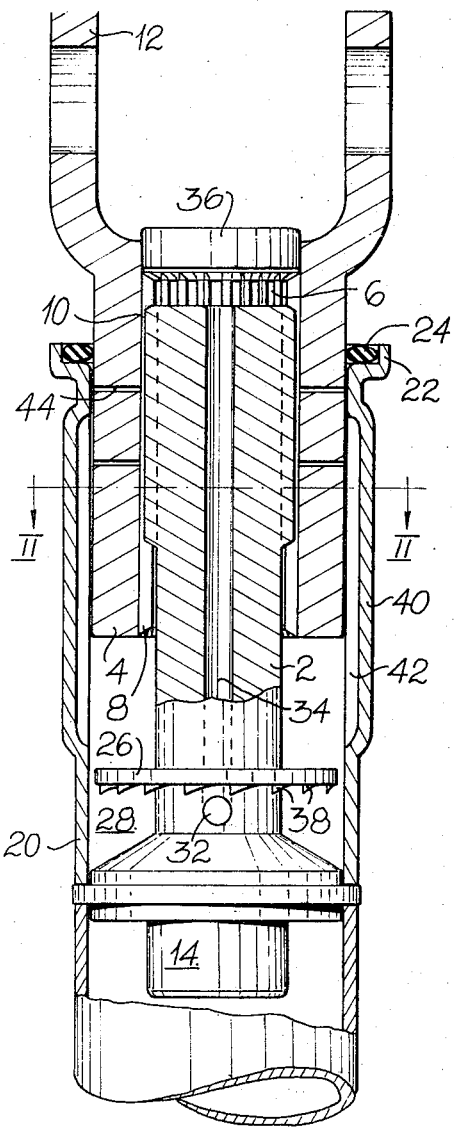
FIG. 1 is a longitudinal sectional view of one form of sliding coupling for automobile propeller shafts constructed in accordance with the invention.
Figure 2:
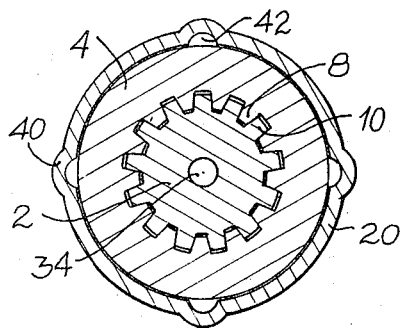
FIG. 2 is a sectional view along lines II—II of FIG. 1.

The sliding coupling illustrated in FIGS. 1 and 2 of the drawings comprises a propeller shaft 2 coupled to an outer shaft 4 of larger diameter and having an axial bore 6. Outer shaft 4 is formed with internal splines 8 adapted to receive the mating external splines 10 on the inner shaft to provide a rotary coupling between the two shafts with limited axial movement. Shaft 4 is carried at the end of a yoke 12 of the automobile universal joint; and propeller shaft 2 is fixed, as by welding, to a stub shaft 14 of larger diameter and coupled to the rear axle of the automobile.

Such a sliding coupling is conventional in automobile transmissions and is lubricated with grease. It is very important that the propeller shaft 2 be maintained in exact alignment with shaft 4, since any misalignment between the two shafts will cause vibrations in the coupling and will greatly increase the rate of wear.

According to the present invention, a bearing sleeve 20 is provided having an inner diameter substantially equal to the outer diameter of shaft 4. One end of sleeve 20 is joined, as by welding, to the enlarged diameter portion 14 of the propeller shaft 2, and the opposite end of the sleeve, for a substantial part of the sleeve length, bears against the external surface of the outer shaft 4. Sleeve 20 thus securely holds the two shafts 2 and 4 in exact alignment, preventing vibrations and reducing the rate of wear. Even when wear begins in the coupling, sleeve 20 maintains the two shafts in exact alignment and prevents sagging. Thus, the provision of bearing sleeve 20 greatly extends the useful life of the coupling.

The coupling is lubricated with oil rather than with grease. For this purpose, the outer end of bearing sleeve 20 is formed with an out-turned flange 22 for receiving an oil retainer seal 24 between it and the outer surface of shaft 4. The coupling further includes a radial disc 26 fixed to propeller shaft 2 which forms a compartment 28 between it and enlarged portion 14 of the propeller shaft. Compartment 28 is adapted to receive lubricating oil which passes through a radial passageway 32 and then through an axial passageway 34 formed in shaft 2. The end of bore 6 in shaft 4 is closed by a cap 36 to prevent the oil from exiting from the joint. It will be seen that oil introduced into compartment 28 lubricates the splines 8 and 10, and also the surfaces between sleeve 20 and shaft 4.

Disc 26 is preferably formed with vanes 38 on the face of the disc within oil compartment 28 to circulate the oil through the sliding coupling.

Particularly for longer sliding joints, the upper surface of telescoping sleeve 20 may be formed with axially extending ribs 40 for strengthening the sleeve. The inner surface of the sleeve defines axially-extending passageways 42 for circulating oil between sleeve 20 and shaft 4, the latter shaft including radial oil passageways 44. In shorter couplings, the ribs 40 may be omitted. The passageway 34 may be formed with a helical groove for directing the lubricating oil.

Figure 3:
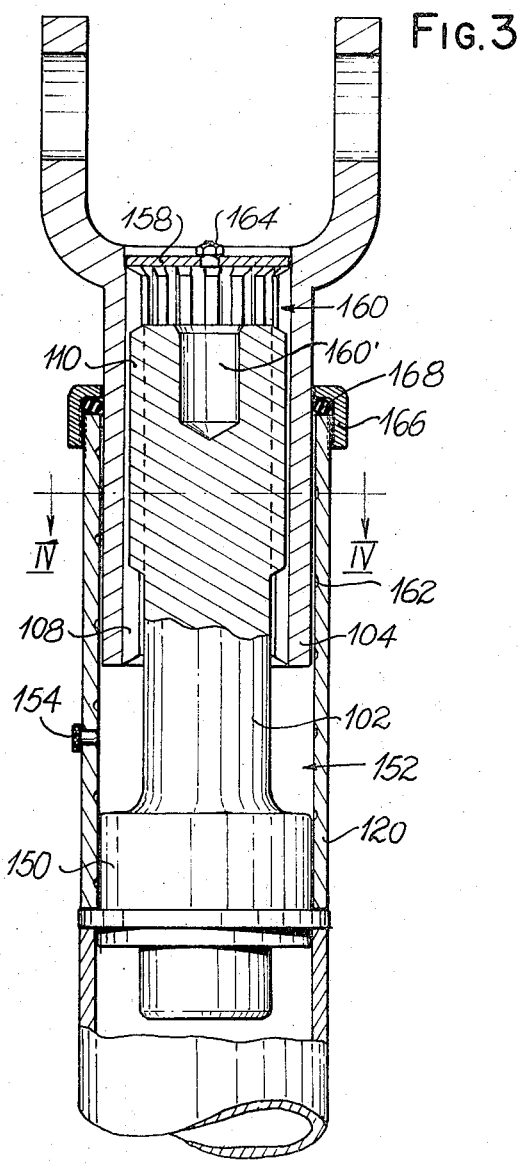
FIG. 3 is a longitudinal sectional view of another coupling constructed in accordance with the invention.
Figure 4:
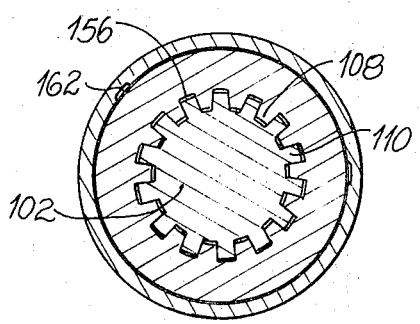
FIG. 4 is a sectional view along lines IV—IV of FIG. 3.

FIGS. 3 and 4 illustrate another form of coupling constructed in accordance with the invention. In this embodiment, the bearing sleeve 120 is joined to the inner shaft 102 by means of a ring 150 welded to or formed integrally with shaft 102. An annular space 152 is thus formed between the ring 150 and the splined end of the outer shaft 104. An oil inlet port 154 in sleeve 120 communicates with space 152 and supplies oil to the splines 108, 110 and to the spaces 156 (FIG. 4) between the splines.

The axial bore formed in the outer shaft 104 is closed by a closure member or oil cap 158 at the end thereof opposite to the splines 108, forming a chamber 160 between member 158 and the splined end of the inner shaft 102. Chamber 160 also includes the space 160' within a blind bore formed at the end of the inner shaft 102. Chamber 160 communicates with the spaces 156 between the splines and also with space 152, and serves as a reservoir for the oil circulated between the splines. When the coupling is not rotating, the oil settles within compartment 160 and space 102 and as soon as the coupling rotates, the oil is forced by centrifugal force through the spaces 156 between the splines, and between bearing sleeve 120 and shaft 104 via axially-extending oil passageways 162. A one-way valve 164 is provided in closure member 158 which valve is openable in the event of a build-up of too much pressure in chamber 160, to release air or surplus oil from the compartment. Sleeve 120 is closed at its free end by retainer cap 166 and an oil retainer seal 168. The outer surface of shaft 104 may be chrome-plated.

What is claimed is:

1. A sliding coupling for automobile propellor shafts, comprising: an inner shaft having an end formed with external splines; an outer shaft of larger diameter than the inner shaft and having an axial bore formed with internal splines receiving the inner shaft; a bearing sleeve having an inner diameter equal to the outer diameter of the outer shaft and telescopingly received thereover; one end of said bearing sleeve being rigidly joined to the inner shaft and the opposite end for a substantial part of the sleeve length bearing against the external surfaces of the outer shaft to maintain the two shafts in alignment and to support the coupling against sagging upon occurrence of wear; and an oil retainer seal between the external surface of the outer shaft and said opposite end of the bearing sleeve, enabling the latter sleeve also to serve as an enclosure for lubricating oil for the coupling.

2. A coupling according to claim 1, wherein said inner shaft is formed with a radial passageway connected to an axial passageway for lubricating oil, said outer shaft including an oil cap fixed within and enclosing said bore at the end thereof opposite to that receiving the inner shaft, said outer shaft further including a radial passageway for the lubricating oil.

3. A coupling according to claim 2, wherein said inner shaft includes a disc fixed thereto at a location between said radial passageway and the end of the shaft received within the axial bore of the outer shaft, said disc forming a lubricating oil compartment with said bearing sleeve and including vanes on the face thereof facing said radial passageway of the inner shaft for circulating the oil through the coupling.

4. A coupling according to claim 1, wherein the spline end of the outer shaft is axially spaced from the end of the bearing sleeve joined to the inner shaft, defining an annular space between the two shafts, the bearing sleeve being formed with an inlet port communicating with said space and supplying oil to the splines.

5. A coupling according to claim 4, wherein the axial bore in the outer shaft is closed by a closure member at the end opposite to the splines, forming a chamber between the closure member and the splined end of the inner shaft, said chamber serving as an oil reservoir and communicating with said splines, said closure member including a one-way valve openable under pressure in said chamber for releasing air or surplus oil from the chamber.

* * * * *